Aug. 25, 1959    J. D. BOTTJE ET AL    2,901,219
LOAD BALANCER FOR HOISTS

Filed April 4, 1957    3 Sheets-Sheet 1

INVENTORS
John D. Bottje
Robert B. Shulters

By Charles W. Walter
ATTORNEY

INVENTORS
JOHN D. BOTTJE
ROBERT B. SHULTERS
By Charles W. Walton
ATTORNEY

INVENTORS
JOHN D. BOTTJE
ROBERT B. SHULTERS
BY Charles W. Walton
ATTORNEY

United States Patent Office 2,901,219
Patented Aug. 25, 1959

2,901,219

LOAD BALANCER FOR HOISTS

John D. Bottje, Grand Haven, and Robert B. Shulters, Spring Lake, Mich., assignors to Gardner-Denver Company, Quincy, Ill., a corporation of Delaware Application April 4, 1957, Serial No. 650,695

13 Claims. (Cl. 254—168)

This invention relates to load balancers which are used to counterbalance or neutralize the weight of a load suspended therefrom and are so constructed that application of a lifting or lowering force equal to a mere fraction of the weight of the load will elevate or lower the load within the range of the load balancer. Load balancers have many practical applications in industry such as supporting a heavy tool which must be positioned and repositioned to its work. Load balancers may also be used in combination with a hoist so that a load may be lifted by the hoist over the bed of a machine tool, and then utilizing the balancer the load may be manually positioned on the machine bed, between centers, etc.

It is an object of this invention to provide a load balancing device utilizing a novel arrangement of elements many of which are standard items that are commercially available.

It is a more specific object of this invention to provide a balancing device suitable for use with a hoist so that a load may be lifted or lowered by the hoist and then by means of the balancing device, the load may be manually positioned within the operative range of the balancing device.

It is a further object of this invention to provide pneumatic controls adapted to control a balancing device used in combination with a pneumatic hoist.

Further objects and purposes of this invention will become apparent upon reading the following specification and drawings.

Figure 1:
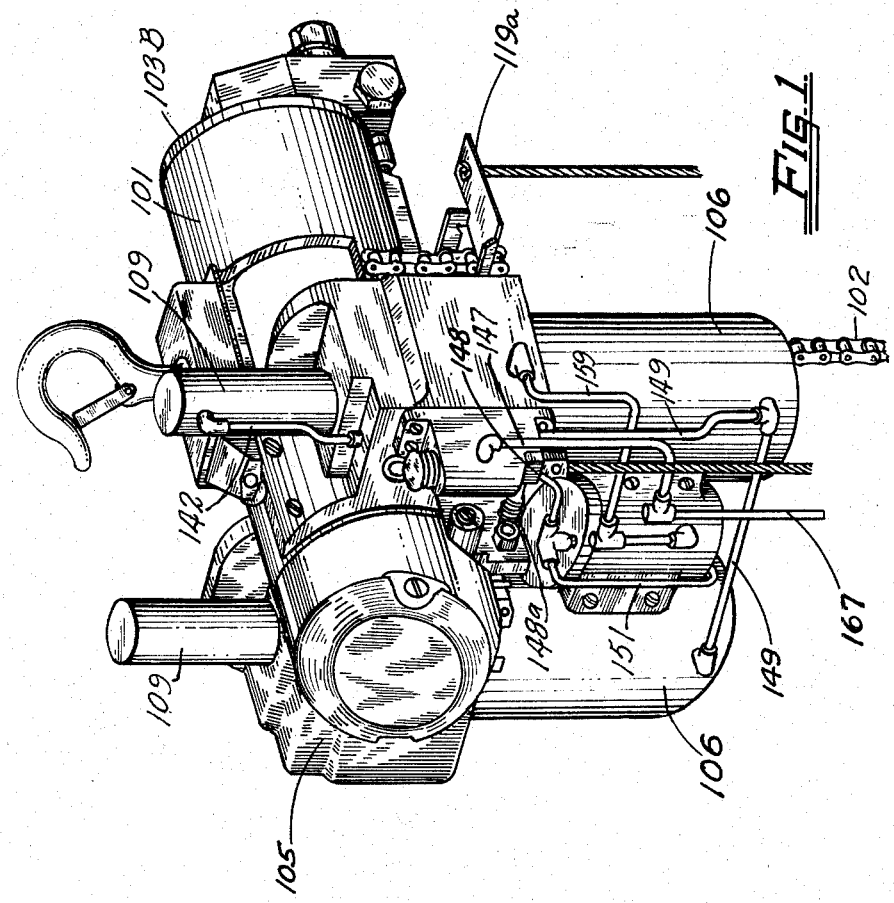
Fig. 1 is a perspective view of a conventional pneumatic hoist to which a load balancing mechanism in accordance with this invention has been added.

Fig. 1 illustrates a conventional pneumatic hoist 101 having a pressure fluid motor of a known type, a sprocket driven thereby, and a load supporting chain 102 carried by the sprocket, to which a load balancing mechanism has been added. With this combination a load may be lifted by the chain 102 driven by the hoisting mechanism to a certain height and then manually shifted to a final location, as between the centers of a machine tool, within the range of the load balancing mechanism.

Figure 2:
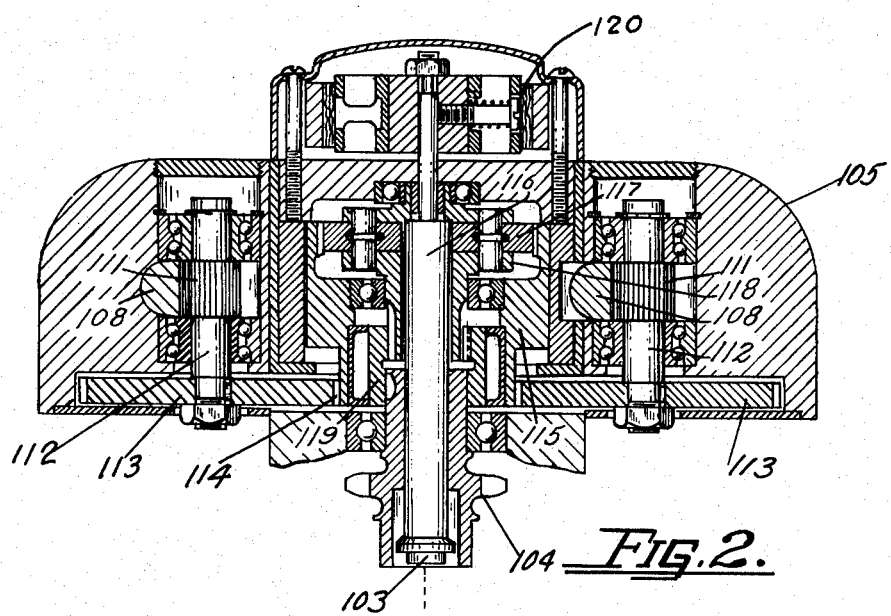
Fig. 2 is a partial vertical section of the hoist and balancer shown in Fig. 1.
Figure 3:
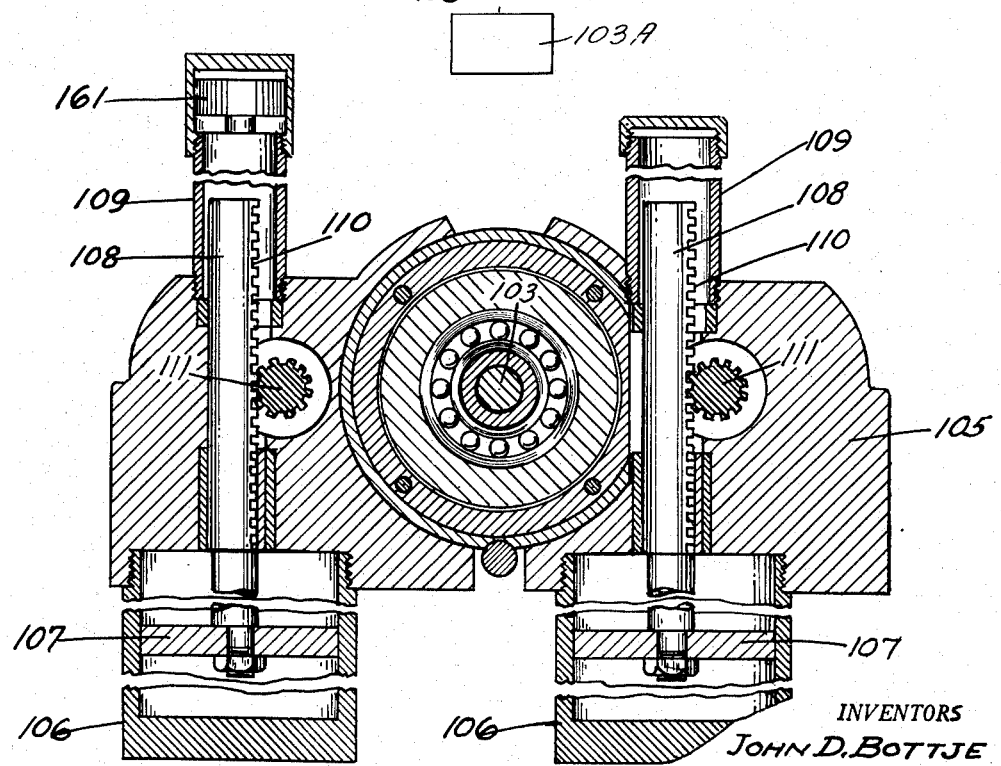
Fig. 3 is a partial transverse section of the hoist and balancer of Fig. 1.

Figs. 2 and 3 show the driving mechanism of the hoist and balancer of Fig. 1. A driving spindle 103, driven by a pressure fluid motor 103a within a head 103b, drives a sprocket 104 through a planetary gear train within a head 105 as will be more fully described hereafter. The balancer mechanism consists of a pair of single acting air cylinders 106 fastened to the head 105 and having a pair of movable pistons 107 therein. The pistons are fixed to piston rods 108 which reciprocate within the head 105 and extend through the head into rod enclosures 109. The piston rods are operatively connected to the sprocket 104 by means of gear trains within the head 105. Accordingly, the piston rods 108 are provided with rack teeth 110 which mesh with pinion gears 111 on shafts 112 which in turn are keyed to spur gears 113. The spur gears mesh with external teeth 114 of a ring gear 115 which is part of a planetary gear train for driving the sprocket 104. When used as a hoist pressure fluid at full line pressure is admitted to the cylinders 106, as will be hereafter described, forcing the pistons 107 to their extreme position against the head 105 and holding the aforementioned gears stationary. The hoist motor 103a is, therefore, able to drive the sprocket 104 through a spindle gear 116, and a plurality of idler gears 117 rotating within the stationary ring gear 115 thence to a gear cage 118 which is pinned to the idler gears and through a gear adapter 119 which is keyed to an extension of the sprocket 104. The operation of the hoist motor is controlled by control lever 119a.

When the balancing mechanism of the hoist and balancer is to be used, air pressure in the cylinders 106 is relieved as will be described hereafter and the weight of a load on the chain 102 tends to turn the sprocket 104 in the opposite direction from the direction of rotation when the load was lifted by the hoist. This rotational force is transmitted through adapter 119 and gear cage 118 to idler gears 117. As in most conventional hoists the driving spindle 103 and spindle gear 116 are held stationary when the hoist is inoperative by a brake mechanism 120 which is more fully explained in Patent Number 2,566,036 issued August 38, 1951, to E. H. Shaff. With the spindle gear 116 held stationary the rotational force of idler gears 117 tends to turn the ring gear 115 which in turn through external teeth 114 transmits the force to spur gears 113 tending to turn pinion gears 111 which mesh with the racks of piston rods 108 thereby tending to force pistons 107 downward. Movement of the pistons in this direction within the cylinders 106 is opposed by the pressure of air within the cylinders. With proper regulation of the air pressure in cylinders 106, the load on the chain can be balanced so that to move the load it is only necessary to apply enough external force to the load to overcome the friction of the hoist-balancer mechanism.

Figure 4:
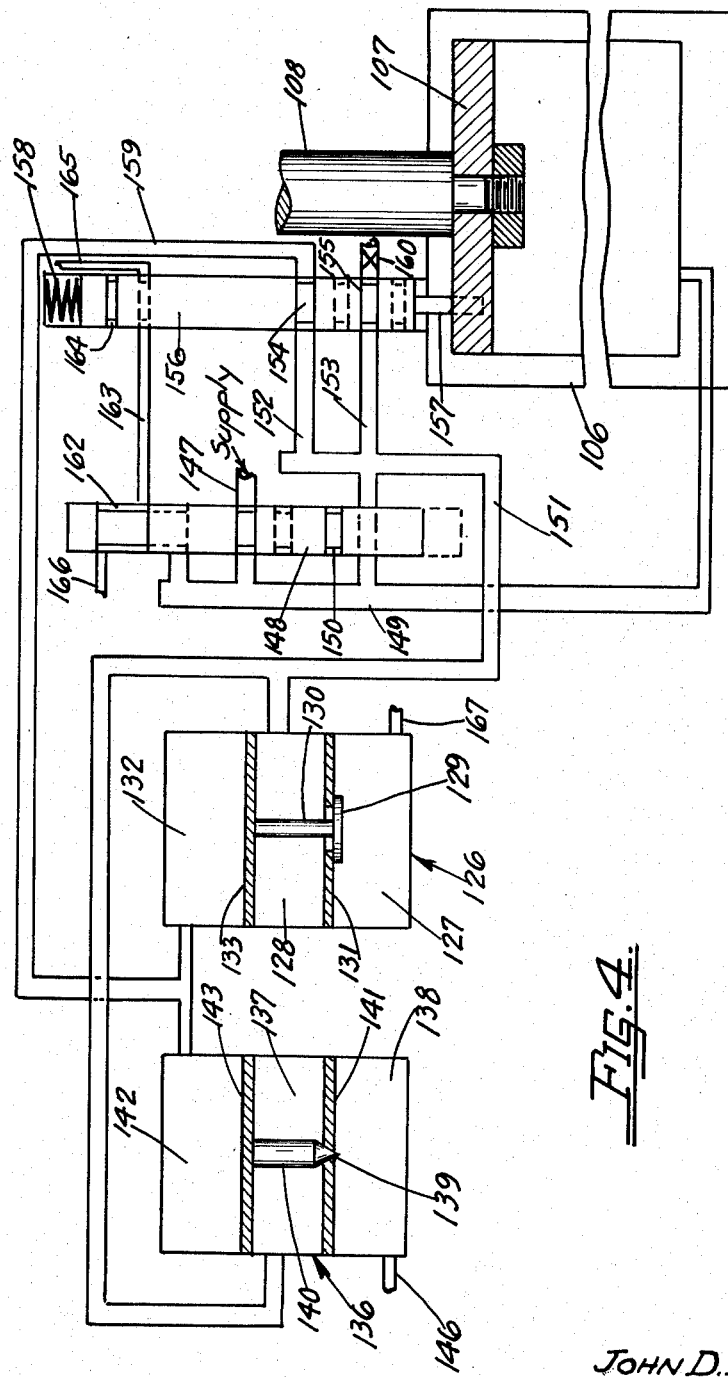
Fig. 4 is a diagrammatic representation of a pneumatic control circuit that is peculiarly adaptable for use with the pneumatic hoist and balancer illustrated in Figs. 1–3.

Fig. 4 diagrammatically illustrates an air circuit for controlling the fluid pressure in the cylinders 106. In this circuit, air at line pressure is introduced through a conduit 147 to a manual control valve 148. During operation of the hoisting mechanism, air at line pressure is conducted through valve 148 and a conduit 149 to the end portions of cylinders 106 forcing pistons 107 therein to their extreme positions against the opposite end walls of the cylinders. In this position, the pistons 107 lock the ring gear 115 (Fig. 2) as hereinbefore described so that the driving spindle of the hoist may turn the sprocket 104.

When a load is suspended by the hoist and it is desired to use the balancing mechanism, the valve 148 is manually shifted to the position shown by the dotted lines in Fig. 4. In this position of the valve, the supply of air at line pressure to the cylinders 106 is cut-off. The valve is held in this position by an interlock 148a. But the pressure in the cylinders is now conducted through an annular groove 150 in the valve 148 to a conduit 151 which is in communication with an outlet chamber 128 of a pressure regulator 126 and with an inlet chamber 137 of a pressure relief valve 136. Also by means of interconnecting conduits 152 and 153 the air pressure in the cylinders 106 is transmitted through annular grooves 154 and 155 in an automatic valve 156. Automatic valve 156 has a stem 157 projecting through an aperture in the end wall of one of the cylinders 106 and is resiliently urged by a spring 158 toward said cylinder. In the position of valve 156 shown in solid lines, air pressure passes through annular groove 154 to conduit 159 which is in communication with control chambers 132 and 142 of pressure regulator 126 and pressure relief valve 136 respectively. Annular groove 155 of automatic valve 156 is connected to a needle valve 160 which serves to bleed the air from cylinders 106, control chambers 132 and 142, outlet chamber 128, inlet chamber 137 and the interconnecting conduits to atmosphere.

When enough air has been bled from the system so that rotational forces resulting from the weight of the load on the sprocket cause the pistons 107 to move away from the end walls of cylinders 106, spring 158 will cause automatic valve 156 to shift to the position shown by dotted lines in Fig. 4. In this position of automatic valve 156 the air pressure in control chambers 132 and 142 is locked in and the bleeding of air to atmosphere is interrupted. However, in this position cylinders 106, outlet chamber 128 and inlet chamber 137 remain in communication through annular groove 150 in manual valve 148. Thereafter, as the load on the hoist-balancer is manually raised and lowered air is admitted and released from the cylinders through pressure regulator 126 and pressure relief valve 136 as hereinafter described. It will be apparent that with this arrangement the balancing mechanism will sense the weight of the load so that the air pressure remaining in control chambers 132 and 142 is automatically adjusted to the pressure necessary to counterbalance any load that may be suspended from the sprocket.

Pressure fluid is admitted to, or withdrawn from, the cylinders 106 by means of the controls diagrammatically represented in Fig. 4 and consisting of two main elements with interconnecting air passages and valves. The pressure regulator 126 has a valve chamber including an inlet chamber 127, an outlet chamber 128, a valve 129 on a valve stem 130 between said chambers and controlling the flow of fluid through an opening in a wall 131 separating the two chambers 127 and 128, and a control chamber 132 with a diaphragm 133 separating the control chamber 132 and the outlet chamber 128.

The pressure relief valve 136 has a valve chamber including an inlet chamber 137, an outlet chamber 138, a needle type valve 139 on a valve stem 140 between said chambers and controlling the flow of fluid through an opening in a wall 141 separating the chambers 137 and 138, and a control chamber 142 with a diaphragm 143 separating the control chamber 142 and the inlet chamber 137.

The outlet chamber 138 of pressure relief valve 136 is vented to atmosphere through a passage 146.

Once the air system is in balance to suspend a load through the interaction of valves 148 and 126 as hereinbefore described, the load may be moved up and down by merely overcoming the friction of the balancing device. When the load is raised the pistons 107 move away from the lower ends of the cylinders 106 enlarging the volume and reducing the pressure therein. This results in a reduction of the pressure in outlet chamber 128 of pressure regulator 126. The pressure in control chamber 132 of pressure regulator 126 then forces diaphragm 133 and valve stem 130 downward to open the valve 129 admitting additional air pressure from an air supply conduit 167 to outlet chamber 128 and cylinders 106 until the balance between the control and outlet chambers of pressure regulator 126 is restored and valve 129 closes. At the same time pressure in the inlet chamber 137 of pressure relief valve 136 was decreased but the force tending to move diaphragm 143 and valve stem 140 downward only served to hold valve 139 closed more firmly.

When the load is lowered, the pistons 107 move toward the lower ends of the cylinders 106 decreasing the volume and increasing the pressure therein. This results in an increase in the pressure in inlet chamber 137 of pressure relief valve 136. The control pressure in control chamber 142 of the pressure relief valve is overcome forcing diaphragm 143 and valve stem 140 upward to open the relief valve 139 to bleed air pressure in inlet chamber 137 through outlet chamber 138 and passage 146 to atmosphere until the balance between the control and inlet chambers of pressure relief valve 136 is restored and valve 139 closes. At the same time pressure in the outlet chamber 128 of pressure regulator 126 was increased but the force tending to move diaphragm 133 and valve stem 130 upward only served to hold valve 129 closed more firmly.

In order to prevent piston 107 from rising far enough to shift automatic valve 156 to its original position which would allow the pressures in the system to bleed to atmosphere, stop means such as an air ram 161 (Fig. 3) may be used in the end of one of the piston rod enclosures 109 to stop the piston 107 below the stem 157 of automatic valve 156. Such an air ram may be actuated when manual valve 148 and automatic valve 156 are in the positions shown by dotted lines so that the air pressure in the cylinders 106 is transmitted through annular groove 162 of the valve 148, connecting passage 163, and annular groove 164 in valve 156 thence through connecting passage 165 to the air ram.

When it is desired to again utilize the hoist-balancer as a hoist, valve 148 is returned to its original position as a result of the release of interlock 148a by manual movement of control lever 119a which operates a brake rod, not shown. Full line pressure is again admitted to the cylinders 106 and air pressure in air ram 161 is bled to atmosphere through annular groove 164 of automatic valve 156 connecting conduit 163, and annular groove 162 of manual valve 148 to a vent tube 166. When the pistons 107 are again raised to the top of the cylinder 106 stem 157 of automatic valve 156 is engaged shifting valve 156 to its original position which also interrupts communication between the air ram 161 and passage 163.

The claims of the present application relate generally to the structure and the pneumatic control systems for a load balancer adapted for use with a hoist. Another application filed concurrently herewith by the same inventors and entitled Load Balancing Devices describes and claims a load balancing device adapted for operation as a unit separate from a hoist.

It will be apparent to one skilled in the art of hoists, balancers and pneumatic controls that other pressure fluid actuated means may be substituted for the cylinder and piston arrangement described herein and that the structures herein described lend themselves to many additional variations which will fall within the scope of the invention claimed.

We claim as our invention:

1. In a hoist having a driving spindle and a load lifting element driven thereby through a differential mechanism: a load balancing device comprising a cylinder having a reciprocable piston therein, said piston being connected to said load lifting element through said differential mechanism; and means for directing fluid pressure to said cylinder active upon said piston to counterbalance a load on said load lifting element.

2. In a hoist having a driving spindle, a load lifting element driven thereby and a brake engageable with said spindle: a load balancing device comprising a cylinder having a reciprocable piston therein, a plurality of gears connecting said piston to said load lifting element and adapted to transmit rotational force applied to said load lifting element to said piston when said brake engages said spindle; and means for directing pressure fluid to said cylinder and active upon said piston to counterbalance the weight of a load carried by said load lifting element.

3. In a hoist having a driving spindle connected to a load lifting element through a plurality of gears including a ring gear: a load balancing device comprising a pressure fluid cylinder with a reciprocable piston therein, a gear train connecting said piston through said ring gear to said load lifting element; said plurality of gears serving to transmit rotational force from said driving spindle to said load lifting element to raise and lower a load; said gear train also serving to transmit rotational force from said load lifting element to said piston; and means for directing pressure fluid to said cylinder whereby pressure exerted upon said piston substantially counterbalances the weight of the load supported by said load lifting element.

4. In a hoist having a pressure fluid motor and a driving spindle driven thereby, a plurality of gears connecting said spindle to a load lifting element and a load brake adapted to hold said spindle stationary when said motor is inoperative: a load balancing device comprising a pressure fluid cylinder with a reciprocable piston therein, means connecting said piston to said load lifting element, said means transmitting rotational force from said load lifting element to said piston when said spindle is held stationary by said brake; and a fluid pressure system connected to said cylinder and adapted to be connected to a source of pressure fluid.

5. In a hoist having a motor, a driving spindle driven thereby, a gear train including a ring gear connecting said spindle to a load lifting element, and a load brake engageable with said spindle when said motor is inoperative: a load balancing device comprising a pressure fluid cylinder with a reciprocable piston therein and a gear connecting said piston to said ring gear; means for holding said ring gear whereby said load lifting element may be driven by said motor to raise and lower a load and means for releasing said ring gear whereby rotational force from said load lifting element is transmitted to said piston; and means for directing pressure fluid active against said piston to counterbalance a load supported by said load lifting element.

6. In a hoist having a driving spindle, means for driving said spindle, and a load lifting element driven thereby through a differential mechanism: a load balancing device comprising a cylinder having a reciprocable piston therein, said piston being connected to said load lifting element through said differential mechanism; a fluid pressure system connected to said cylinder and adapted to be connected to a source of pressure fluid, said system including regulating means for admitting pressure fluid to said system and to exhaust pressure fluid therefrom to maintain pressure fluid in said cylinder active upon said piston at a pressure which will counterbalance a load supported by said load lifting element; and a pressure chamber to which pressure fluid may be admitted to control said regulating means.

7. In a hoist having a driving spindle and a load lifting element driven thereby through a differential mechanism: a load balancing device comprising a cylinder having a reciprocable piston therein, said piston being connected to said load lifting element through said differential mechanism; a fluid pressure system connected to said cylinder and adapted to be connected to a source of pressure fluid, said system including regulating means for admitting pressure fluid to said system and to exhaust pressure fluid therefrom to maintain pressure fluid active against said piston at a pressure which will counterbalance a load supported by said load lifting element; a pressure chamber to which pressure fluid may be admitted to control said regulating means; and valve means comprising a first valve element and a second valve element, said first valve element adapted in a first position thereof to direct full line pressure from said source to said cylinder to move said piston to one end position, said first valve element in a second position thereof interrupting the flow of pressure fluid to said cylinder but permitting communication between said cylinder, said system and said second valve element, said second valve element in a first position thereof adapted to provide communication with said control chamber and through an orifice to atmosphere whereby pressure fluid in said cylinder, said system and said control chamber may be bled to atmosphere; said second valve element being adapted to shift to a second position in response to movement of said piston from said one end position to interrupt communication with said control chamber and said orifice.

8. In a hoist having a driving spindle, means for driving said spindle, and a load lifting element driven thereby through a differential mechanism: a load balancing device comprising a cylinder having a reciprocable piston therein, said piston being connected to said load lifting element through said differential mechanism; a fluid pressure system connected to said cylinder and adapted to be connected to a source of pressure fluid, said system including regulating means for admitting pressure fluid to said system and to exhaust pressure fluid therefrom to maintain pressure fluid in said cylinder active against said piston at a pressure which will counterbalance a load supported by said load lifting element; and a pressure chamber to which pressure fluid may be admitted to control said regulating means; and valve means comprising first and second valve elements adapted to sequentially supply full line pressure from said source to said cylinder to move said piston to one end position, interrupt the supply of pressure fluid to said cylinder, vent pressure from said cylinder, said system and said control chamber to atmosphere, and simultaneously close off said vent to atmosphere and close off said control chamber when the pressure in said cylinder is sufficient to counterbalance a load supported by said load supporting means.

9. In a hoist having a driving spindle and a load lifting element driven thereby: a load balancing device comprising a cylinder having a reciprocable piston therein connected to said load lifting element; a fluid pressure system connected to one side of said cylinder and adapted to be connected to a source of pressure fluid, said system including a pressure regulating device and a pressure relief device, each of said devices having a control chamber and a valve chamber, said valve chambers being in communication with each other, with said cylinder and with said source of pressure fluid, said control chambers being in communication with each other; said devices being adapted to admit pressure fluid to said system and to exhaust pressure fluid therefrom to maintain pressure fluid in said cylinder active against said piston at a pressure which will counter-balance a load supported by said load lifting element; and valve means comprising a first valve element adapted in a first position thereof to supply full line pressure from said source to said cylinder, said first valve element in a second position thereof interrupting the supply of pressure fluid to said cylinder but permitting communication between said cylinder, said valve chambers and a second valve element; said second valve element in a first position thereof adapted to provide communication with said control chambers and through an orifice to atmosphere whereby pressure fluid in said cylinder, said valve chambers and said control chambers may be bled to atmosphere; said second valve element being adapted to shift to a second position in response to movement of said piston to interrupt communication with said control chambers and said orifice.

10. In a load balancer comprising a cylinder having a reciprocable piston therein and load supporting means connected to said piston: a fluid pressure system connected to one side of said cylinder and adapted to be connected to a source of pressure fluid, said system including a pressure regulating device and a pressure relief device, each of said devices having a control chamber and a valve chamber, said valve chambers being in communication with each other, with said cylinder and with said source of pressure fluid, said control chambers being in communication with each other; said devices being adapted to admit pressure fluid to said system and to exhaust pressure fluid therefrom to maintain pressure fluid in said cylinder active against said piston at a pressure which will substantially counterbalance a load supported by said load supporting means; valve means comprising a first valve element adapted in a first position, thereof to supply full line pressure from said source to said cylinder, said first valve element in a second position thereof interrupting the supply of pressure fluid to said cylinder but permitting communication between said cylinder, said valve chambers and a second valve element; said second valve element in a first position thereof adapted to provide communication with said control chambers and through an orifice to atmosphere whereby pressure fluid in said cylinder, said valve chambers and said control chambers may be bled to atmosphere; said second valve element being adapted to shift to a second position in response to movement of said piston to interrupt communication with said control chambers and said orifice; and means for preventing inadvertent shifting of said second valve to its first position while said first valve is in its second position.

11. In a load balancer comprising a cylinder having a reciprocable piston therein and load supporting means connected to said piston: a fluid pressure system connected to said cylinder and adapted to be connected to a source of pressure fluid, said system including a pressure regulator comprising a housing, a resilient diaphragm within said housing dividing said housing into a control chamber and a valve chamber, a valve in said valve chamber adapted to admit pressure fluid thereto from said source when the pressure in said control chamber exceeds the pressure in said system, said system also including a pressure relief device comprising a housing a resilient diaphragm within said housing dividing said housing into a control chamber and a valve chamber, said valve chamber communicating with said cylinder and said valve chamber of said pressure regulator, a valve in said valve chamber of said pressure relief device adapted to exhaust pressure fluid therefrom when the pressure in said valve chamber exceeds the pressure in said control chamber, and means for admitting pressure fluid from said source to said control chambers; and valve means comprising a first valve element adapted in a first position thereof to supply full line pressure from said source to said cylinder, said first valve element in a second position thereof interrupting the supply of pressure fluid to said cylinder but permitting communication between said cylinder, said valve chambers and second valve element; said second valve element in a first position thereof adapted to provide communication with said control chambers and through an orifice to atmosphere whereby pressure fluid in said cylinder, said valve chambers and said control chambers may be bled to atmosphere; said second valve element being adapted to shift to a second position in response to movement of said piston to interrupt communication with said control chambers and said orifice.

12. In a load balancer comprising a cylinder having a reciprocable piston therein and load supporting means connected to said piston: a fluid pressure system connected to said cylinder and adapted to be connected to a source of pressure fluid, said system including a pressure regulator comprising a housing, a resilient diaphragm within said housing dividing said housing into a control chamber and a valve chamber, a valve in said valve chamber adapted to admit pressure fluid thereto from said source when the pressure in said control chamber exceeds the pressure in said system, said system also including a pressure relief device comprising a housing, a resilient diaphragm within said housing dividing said housing into a control chamber and a valve chamber, said valve chamber communicating with said cylinder and said valve chamber of said pressure regulator, a valve in said valve chamber of said pressure relief device adapted to exhaust pressure fluid therefrom when the pressure in said valve chamber exceeds the pressure in said control chamber, and means for admitting pressure fluid from said source to said control chambers; valve means comprising a first valve element adapted in a first position thereof to supply full line pressure from said source to said cylinder, said first valve element in a second position thereof interrupting the supply of pressure fluid to said cylinder but permitting communication between said cylinder, said valve chambers and a second valve element; said second valve element in a first position thereof adapted to provide communication with said control chambers and through an orifice to atmosphere whereby pressure fluid in said cylinder, said valve chambers and said control chambers may be bled to atmosphere; said second valve element being adapted to shift to a second position in response to movement of said piston to interrupt communication with said control chambers and said orifice; and means for preventing inadvertent shifting of said second valve to its first position while said first valve is in its second position.

13. In a hoist having a driving spindle, means for driving said spindle, a load lifting element driven thereby through a differential mechanism, and a brake engageable with said spindle: a load balancing device comprising a chamber having a movable member therein, a plurality of gears connecting said movable member to said load lifting element through said differential mechanism and adapted to transmit rotational force applied to said load lifting element to said movable member when said brake engages said spindle; and means for directing pressure fluid to said chamber and active upon said movable member to counterbalance the weight of a load carried by said load lifting element.

References Cited in the file of this patent

UNITED STATES PATENTS

| 1,892,829 | Choate | Jan. 3, 1933 |
| 2,384,774 | Smallpeice | Sept. 11, 1945 |